United States Patent [19]

Kumpar

[11] 4,357,810

[45] Nov. 9, 1982

[54] UNIVERSAL JOINT

[75] Inventor: Zvonimir Z. Kumpar, Zeist, Netherlands

[73] Assignee: SKF Industrial Trading & Development Co. B.V., Netherlands

[21] Appl. No.: 218,306

[22] Filed: Dec. 19, 1980

[30] Foreign Application Priority Data

Dec. 20, 1979 [NL] Netherlands ......................... 7909198

[51] Int. Cl.³ ................................................ F16D 3/30
[52] U.S. Cl. ...................................... 464/8; 464/145; 464/152; 464/904
[58] Field of Search ..................... 64/21, 7, 8; 180/149

[56] References Cited

U.S. PATENT DOCUMENTS

| 2,838,919 | 6/1958 | Cull | 64/21 |
| 3,789,624 | 2/1974 | Camosso | 64/21 |
| 4,019,347 | 4/1977 | Krude | 64/21 |

FOREIGN PATENT DOCUMENTS 7902092  9/1980  Netherlands ......................... 464/152

Primary Examiner—Edward J. McCarthy
Attorney, Agent, or Firm—Daniel M. Rosen

[57] ABSTRACT

A homokinetic coupling with an inner ring contained within a groove-like ball race within the outer ring, and with a series of flattened balls therebetween for imparting rotation and transmitting forces, the balls being at least partially enclosed by a flexible annular ball cage.

9 Claims, 3 Drawing Figures

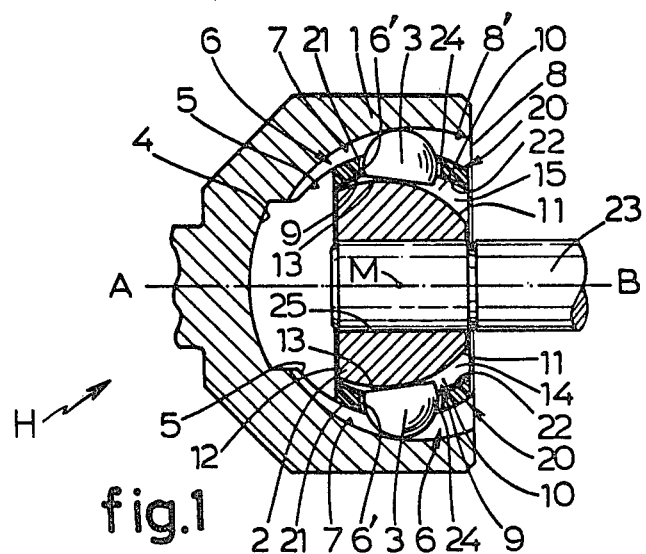
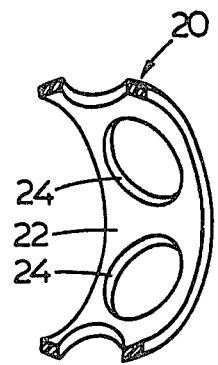
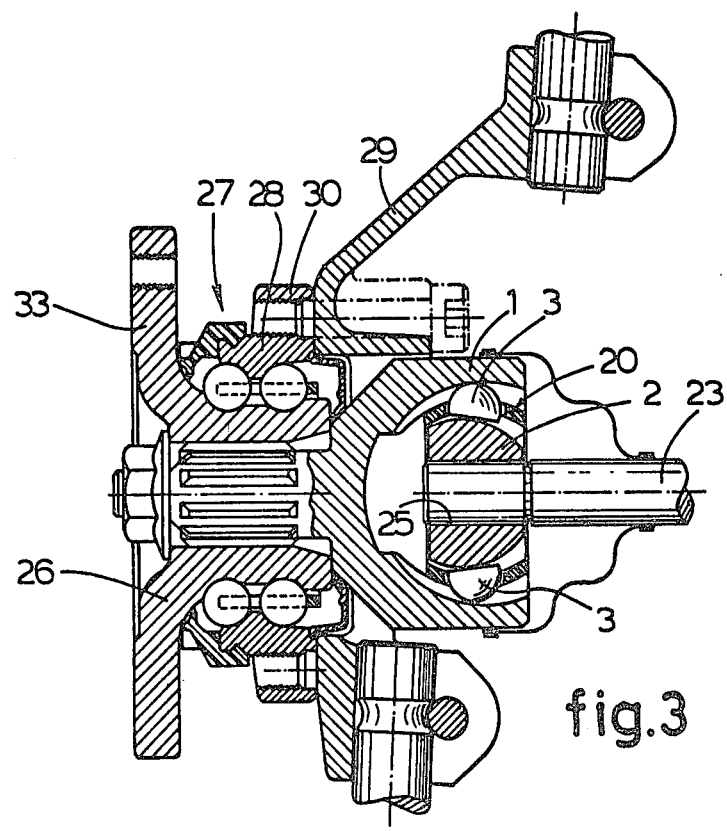

UNIVERSAL JOINT

BACKGROUND OF THE INVENTION

The invention relates to a universal joint or coupling provided with an outer ring having a cavity, an inner ring accomodated in the cavity, and a series of flattened balls which by their round surface are capable of motion in groove-like ball races formed in the cavity and the inner ring, and at the same time during rotation transmit forces from one ring to the other, the flat face of a ball cooperating with the curved surface of the respective ring, the balls being retained by a flexible ball cage.

Such a coupling is described in Dutch patent application No. 79.02092 corresponding to U.S. application Ser. No. 127,809, filed Mar. 6, 1980.

This known coupling is described as being designed such that on the outer surface of the inner ring is mounted a ball-retaining ring supporting four elements which project into the ball races of the inner ring, and on the outer end of the outer ring, over the opening of the cavity of the outer ring, is applied a yielding sealing ring projecting toward the inner ring or the retaining ring.

The present invention seeks to procure a simple coupling design as concerns the means for retaining the balls. For this purpose the coupling pursuant to the invention is characterized in that the balls, over the portion of their spherical surface lying in the space between the groove-like ball races, are enclosed by a flexible annular element known as a ball acge.

The ball cage herein is made of elastic material, as a result of which the balls, which are self-adjusting, i.e., assume the most effective position during loading, are accordingly able to deform the cage slightly. The state of the cage is thus determined exclusively by the self-adjusting balls. In fact, the cage ensures that the balls will not fall out of the coupling and at the same time that the automatic adjustment of the balls will not be hindered or influenced in any way.

Because the cage is made of elastic material it is so flexible that the cage and the entire coupling are very simple to assemble.

It is advantageous if the cage is made of what is known as a solid lubricant, which ensures optimum lubrication of the coupling.

In particular, the coupling pursuant to the invention may be designed such that the cage has the shape of an annular skin of a sphere, the spherical outer surface of which matches the spherical surface of the cavity of the outer ring while the spherical inner surface of the cage is concentric to the spherical outer surface of the cage and matches the spherical outer surface of the inner ring.

The invention will now be explained by means of the drawing, in which a preferred embodiment of the coupling pursuant to the invention is represented.

BRIEF DESCRIPTION OF THE DRAWINGS

FIG. 1 shows an axial cross section of the coupling pursuant to the invention in the state in which the shafts to be coupled are continuations of one another.

FIG. 2 shows, in perspective, a portion of the ball cage pursuant to the invention.

FIG. 3 shows the application of the coupling in the bearing of the front-wheel drive of an automobile.

As is represented in FIG. 1, the coupling H comprises an outer ring 1, an inner ring 2, a series, commonly six, of flattened balls 3 for transmitting the rotation of one ring to the other ring, as is described in Dutch patent application No. 79.02092. The rotary shaft of the outer ring is indicated in FIG. 1 by A–M. The outer ring 1 has a cavity 4 having a spherical surface 5 with midpoint M; in the surface 5 are formed, distributed uniformly about the rotary shaft A–M, as many groove-like ball races 6 as there are balls 3. The ball races 6 are in general oriented according to planes which run through the rotary shaft A–M. In FIG. 1 the grooved bottoms of the ball races 6 are indicated by the curve 7, whence it appears that the ball races 6, toward the opening 8 of the cavity 4, become deeper at the outer end of the outer ring 1 and end in undercuts 8', as a result of which axial disconnection of the rings 1,2 is simply not possible.

In the cavity 4 of the outer ring 1 is accomodated the inner ring 2, the rotary shaft of which is indicated in FIG. 1 by B–M. In FIG. 1 the rotary shafts A–M and B–M of the outer ring 1 and the inner ring 2 are continuations of one another, but they are able to make a maximum angle of deflection with one another which amounts to approximately 40°. The inner ring 2 has a spherical outer surface 9, the midpoint of which lies at M, hence on the line A–B. In the spherical outer surface 9 of the inner ring 2, distributed uniformly about the rotary shaft, are again formed as many groove-like ball races 10 as there are balls 3. The races 10 are in general oriented according to planes which run through the rotary shaft B–M of the inner ring 2. In FIG. 1 the grooved bottoms of the races 10 are indicated by the curves 11, from which it appears that the races 10, from the inner end 12 of the inner ring 2, become deeper toward the outside. Each ball 3 is accomodated partially in a ball race 6 of the outer ring 1 and partially in a ball race 10 of the inner ring 2. The balls 3, over the part of their spherical surface lying in the space 6' between the groove-like ball races 6, 10, are enclosed pursuant to the invention by a flexible annular ball cage 20. The cage 20 has an essentially spherical outer surface 21 matching the spherical surface 5 of the cavity 4 of the outer ring 1, and the cage 20 has a spherical inner surface 22 matching the spherical outer surface 9 of the inner ring 2. The cage 20 in this embodiment has the shape of an annular skin of a sphere, wherein for each ball 3 is formed a circular retaining opening 24, which in the assembled state represented in FIG. 1 surrounds the respective ball 3 with a certain clearance and ensures that in the operating condition the balls 3 are unable to fall out of the coupling, while the balls retain the freedom to find the proper position for the optimum transmission of forces during rotation; i.e., the automatic adjustment of the balls under load will likewise not be prevented by the cage pursuant to the invention. It appears in FIG. 1 that the cage 20, in the axial direction A–B, is about as wide as the inner ring 2. The cage 20 is made of elastic and thus flexible material, so that, as already mentioned above, the self-adjustment of the balls 3 in the races 6 and 10 is not influenced, and on the other hand, the assembly of the cage 20 and hence the assembly of the entire coupling is greatly simplified. In particular, the cage 20 may be made of teflon; it is preferable, however, for the cage to consist of a solid lubricant, which, among other things, has the particular property of, even under relatively high tenperature and pressure, uniformly liberating oil without notable modification in shape (of the cage). The balls 3 which are applied in the coupling pursuant to the invention are of the type having a flat face 13, as is described in Dutch patent application No. 79.02092 corresponding to U.S. application Ser. No. 127,809, filed Mar. 6, 1980.

In FIG. 1 is further schematically represented the usual drive shaft 23, which in a bore 25 of the inner ring 2, is connected, rotationally fixed, to the inner ring 2 by bevel gears, not represented.

According to FIG. 2 the openings 24 in the cage 20 are all of approximately like size and these openings 24 have a certain clearance with respect to the balls 3. It is noted that the cage or annular element 20 may be built up of a plurality of (annular) parts, whereby insertion of the cage between the outer and inner rings 1 and 2 is greatly facilitated.

In FIG. 3 application of the coupling pursuant to the invention is represented in the front-wheel drive of an automobile. Herein the coupling is attached to a wheel bearing unit 27, the inner raceway 26 and the outer raceway 28 of which form a whole with the mounting flanges 33 and 30, to which the wheel and the steering device 29 respectively are capable of being attached. This combination thus exhibits a compact construction of a bearing and a drive part in the center of a wheel, whereby stability, control and handling of the automobile are improved.

I claim:

1. A universal coupling comprising an outer ring having a generally spherical inner surface defining a cavity, an inner ring having a generally spherical outer surface situated in and corresponding to said inner surface, a plurality of generally axially extending raceways, each formed as a groove-like outer ring race and a mating groove-like inner ring race in the inner and outer surfaces respectively, a plurality of balls flattened on one face movably situated in each of said raceway, the flat face of each ball engaging the curved outer surface of an inner ring race, and a flexible ball cage situated between said inner and outer surfaces and having a plurality of apertures with one of said balls extending through and being guided by each of said apertures.

2. A coupling according to claim 1 wherein said ball cage has a generally spherical shape generally concentric with said inner and outer surfaces.

3. A coupling according to claim 1 or 2 wherein said balls are self-adjusting by being freely movable except as restricted by said inner and outer races and said cage, and the position of the ball cage is determined essentially exclusively by said self-adjusting balls.

4. A coupling according to claim 2 wherein said cage is elastic.

5. A coupling according to claim 2 wherein said cage comprises synthetic elastic material.

6. A coupling according to claim 2 wherein said cage comprises a solid lubricant which lubricates said coupling.

7. A coupling according to claim 2 wherein said inner and outer surfaces define between then an interspace, and said cage has radial thickness to substantially fill said interspace, except for the portion of the interspace occupied by said balls and the apertures in said cage.

8. A coupling according to claim 2 in combination with a wheel bearing of a front-wheel drive vehicle.

9. A coupling according to claim 2 wherein said cage comprises a plurality of annular parts, thereby facilitating insertion of said cage between said inner and outer surfaces.

* * * * *